(12) United States Patent
Acharya et al.

(10) Patent No.: US 9,301,347 B2
(45) Date of Patent: Mar. 29, 2016

(54) SYSTEM AND METHOD FOR CONTROLLING MAXIMUM OUTPUT DRIVE VOLTAGE OF SOLID STATE LIGHTING DEVICE

(75) Inventors: Kaustuva Acharya, Bartlett, IL (US); Raman Nair Harish Gopala Pillai, Arlington Heights, IL (US); Yimin Chen, Palatine, IL (US); Ajay Tripathi, Libertyville, IL (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/357,626

(22) PCT Filed: Aug. 30, 2012

(86) PCT No.: PCT/IB2012/054467
§ 371 (c)(1),
(2), (4) Date: May 13, 2014

(87) PCT Pub. No.: WO2013/072784
PCT Pub. Date: May 23, 2013

(65) Prior Publication Data
US 2014/0285103 A1 Sep. 25, 2014

Related U.S. Application Data

(60) Provisional application No. 61/531,142, filed on Nov. 14, 2011.

(51) Int. Cl.
*H05B 33/08* (2006.01)
(52) U.S. Cl.
CPC ............ *H05B 33/08* (2013.01); *H05B 33/0812* (2013.01); *Y02B 20/343* (2013.01)

(58) Field of Classification Search
None
See application file for complete search history.

(56) References Cited

U.S. PATENT DOCUMENTS

| | | | |
|---|---|---|---|
| 6,016,038 A | 1/2000 | Mueller et al. | |
| 6,144,222 A | 11/2000 | Ho | |
| 6,211,626 B1 | 4/2001 | Lys et al. | |
| 2006/0001381 A1 | 1/2006 | Robinson et al. | |
| 2006/0071614 A1 | 4/2006 | Tripathi et al. | |
| 2008/0297067 A1 | 12/2008 | Wang et al. | |
| 2009/0085901 A1 | 4/2009 | Antony | |
| 2010/0007283 A1* | 1/2010 | Shimoyoshi et al. | 315/182 |
| 2010/0013409 A1 | 1/2010 | Quek et al. | |
| 2010/0156319 A1* | 6/2010 | Melanson | 315/297 |
| 2010/0244737 A1* | 9/2010 | Madhani et al. | 315/297 |
| 2011/0037410 A1 | 2/2011 | Hsu et al. | |
| 2011/0062870 A1 | 3/2011 | Kanbara | |
| 2011/0115399 A1* | 5/2011 | Sadwick et al. | 315/287 |
| 2012/0112651 A1* | 5/2012 | King et al. | 315/224 |
| 2012/0274290 A1* | 11/2012 | Ye et al. | 323/234 |

* cited by examiner

*Primary Examiner* — Douglas W Owens
*Assistant Examiner* — Raymond R Chai

(57) ABSTRACT

A programmable driver for driving a solid state lighting device includes a processing circuit, a voltage feedback loop and a power stage. The processing circuit is configured to determine a voltage reference signal based on a nominal current setting and a predetermined power limit. The voltage feedback loop is configured to receive the voltage reference signal and to determine a difference between a reference voltage indicated by the voltage reference signal and a drive voltage of the solid state lighting device. The power stage is configured to limit maximum output voltage for driving the solid state lighting device based at least in part on the determined difference between the reference voltage and the drive voltage of the solid state lighting device provided by the voltage feedback loop.

20 Claims, 7 Drawing Sheets

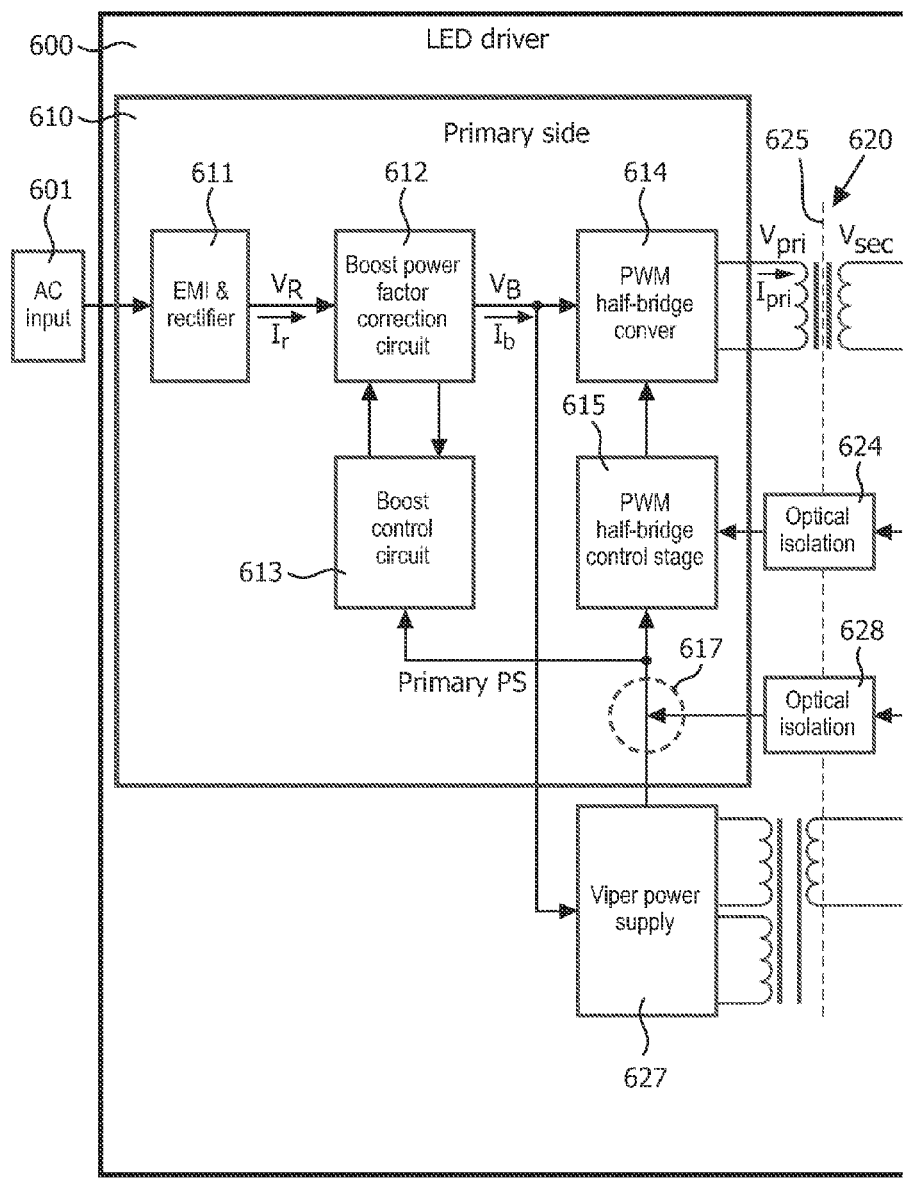
FIG. 6-I

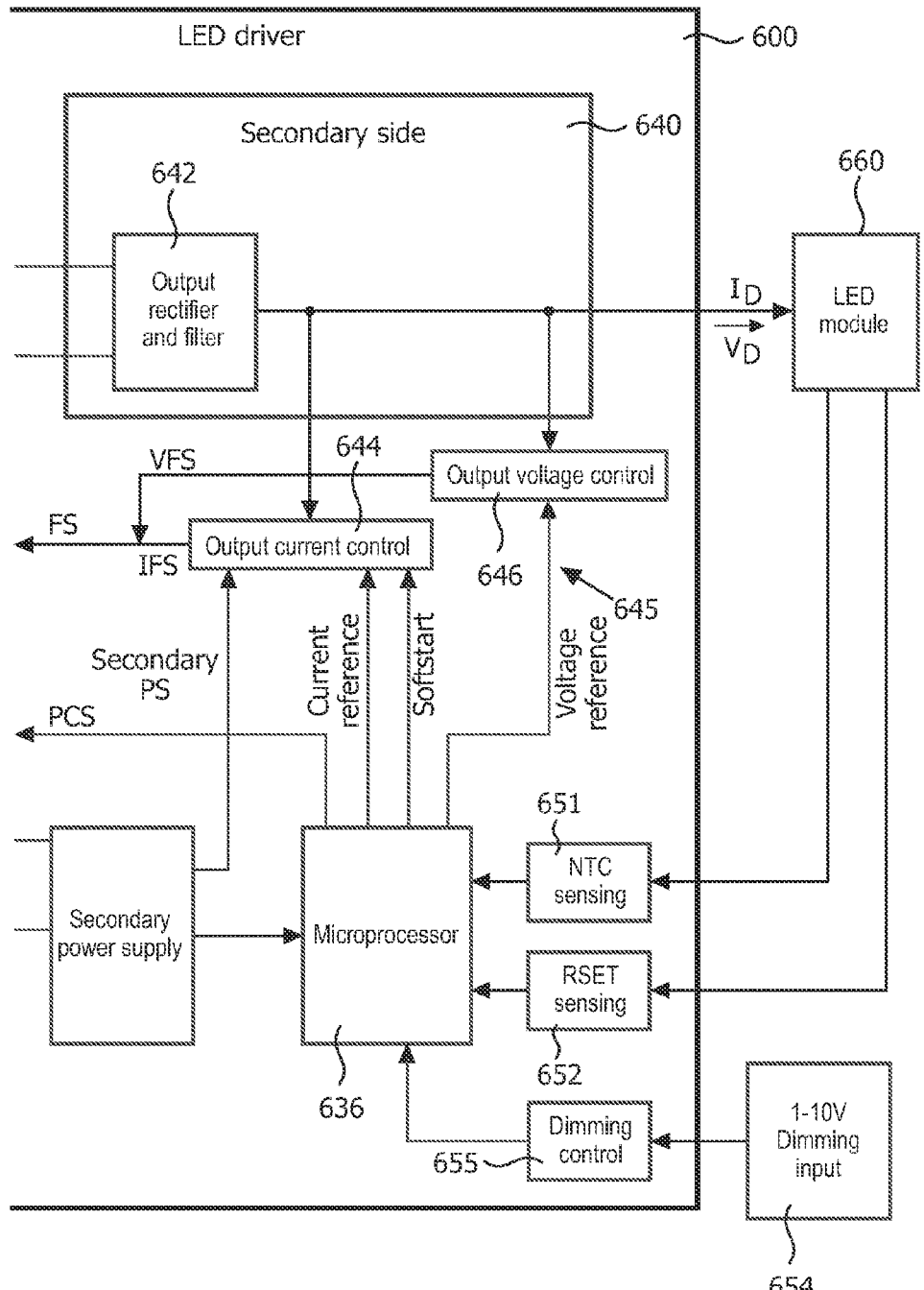
FIG. 6-II

SYSTEM AND METHOD FOR CONTROLLING MAXIMUM OUTPUT DRIVE VOLTAGE OF SOLID STATE LIGHTING DEVICE

CROSS-REFERENCE TO PRIOR APPLICATIONS

This application is the U.S. National Phase application under 35 U.S.C. §371 of International Application No. PCT/032012/054467, filed on Aug. 30, 2012, which claims the benefit of 61/531,142, [e.g., U.S. Provisional Patent Application No. or European Patent Application No.] filed on Nov. 14, 2011. These applications are hereby incorporated by reference herein.

TECHNICAL FIELD

The present invention is directed generally to control of solid state lighting devices. More particularly, various inventive methods and apparatus disclosed herein relate to implementing maximum output voltage control for driving a solid state lighting module.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626.

To keep pace with rapidly advancing LED technology, LED driver circuitry ("LED drivers") have been designed and re-designed to supply suitable drive currents and drive voltages for delivering desired light outputs from a wide variety of LEDs. The LED driver designs, however, lead to a potentially unmanageable increase in the number of different types of commercially available LED drivers. Conventional LED drivers incorporate control means, such as external variable resistors, that enable control of the output current of the LED drive, while keeping the maximum voltage fixed. With this approach, the full power capability of the LED driver is not fully utilized.

FIG. 1 is graph illustrating output current and voltage of conventional drivers. As mentioned above, a conventional LED driver has a fixed maximum output voltage limit, which dictates the operating area of the LED driver. For example, referring to FIG. 1, operating area 110 corresponds to a first (530 mA, 150 W) LED driver and operating area 120 corresponds to a second (700 mA, 150 W) LED driver, each operating area 110, 120 being indicated by dashed lines. The operating area 110 has constant maximum voltage setting of 280V and the operating area 120 has a maximum voltage setting of 210V, regardless of the applied current. Therefore, even if the second LED driver, for example, were operated at a reduced nominal current (e.g., 530 mA instead of 700 mA), the maximum voltage limit would still be 210V, and thus the second LED driver would deliver less power and be unable to utilize its full capability. To deliver the lower current of 530 mA and the same power of 150 W, the first LED driver having a maximum voltage set to 280V would have to be provided in place of the second LED driver.

Thus, there is a need in the art for a solid state lighting device driving technique in which the maximum voltage output by a driver may be varied in response to a reference current and a predetermined power limit.

SUMMARY

The present disclosure is directed to inventive apparatus and method for adjusting maximum output voltage of an LED driver using a voltage reference signal, determined by dividing a predetermined power limit by a nominal current setting. Using the voltage reference signal, the LED may be configured to accommodate a variety of LED modules while utilizing full power capability of the LED driver.

Generally, in one aspect, the invention relates to a programmable driver for driving a solid state lighting device that includes a processing circuit, a voltage feedback loop and a power stage. The processing circuit is configured to determine a voltage reference signal based on a nominal current setting and a predetermined power limit. The voltage feedback loop is configured to receive the voltage reference signal and to determine a difference between a reference voltage indicated by the voltage reference signal and a drive voltage of the solid state lighting device. The power stage is configured to limit maximum output voltage for driving the solid state lighting device based at least in part on the determined difference between the reference voltage and the drive voltage of the solid state lighting device provided by the voltage feedback loop.

In another aspect, a method is provided for driving a light-emitting diode (LED) module using a programmable driver. The method includes determining a nominal current setting indicating desired nominal current provided by the programmable driver; determining a reference voltage signal by dividing a predetermined power limit of the programmable driver by the nominal current setting; determining a difference between a reference voltage indicated by the reference voltage signal and a drive voltage provided to the LED module; and adjusting maximum drive voltage of the LED module based at least in part on the determined difference between the reference voltage and the drive voltage provided to the LED module.

In yet another aspect, the invention focuses on a programmable driver for driving an LED module that includes a microcontroller, an output voltage control and a power stage. The microcontroller is configured to determine a voltage reference signal based on a nominal current setting reference signal and a predetermined power limit. The output voltage control is configured to receive the voltage reference signal and to determine a voltage feedback signal indicating a difference between a reference voltage indicated by the voltage reference signal and a drive voltage of the LED module. The power stage is configured to limit maximum output voltage for driving the LED module based at least in part on the voltage control signal.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 6 is a simplified block diagram showing a programmable driver for a solid state lighting system, according to a representative embodiment.

DETAILED DESCRIPTION

In the following detailed description, for purposes of explanation and not limitation, representative embodiments disclosing specific details are set forth in order to provide a thorough understanding of the teachings of the present invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Applicants have recognized and appreciated that it would be beneficial to provide a circuit capable of adjusting a maximum drive voltage output by an LED driver in response to a predetermined power limit of the LED driver and a reference current.

Thus, according to various embodiments, a programmable LED driver may be used for several different LED loads. Generally, a microprocessor is configured to program the LED driver to a desired current (reference current), while ensuring that the power is limited to a predetermined value by adjusting maximum output voltage. This helps to reduce the number of types of LED drivers that need to be available as stock keeping units (SKUs), and enables LED replacement as LED efficacy and current capability rapidly advances, without having to replace the LED driver.

Figure 2:
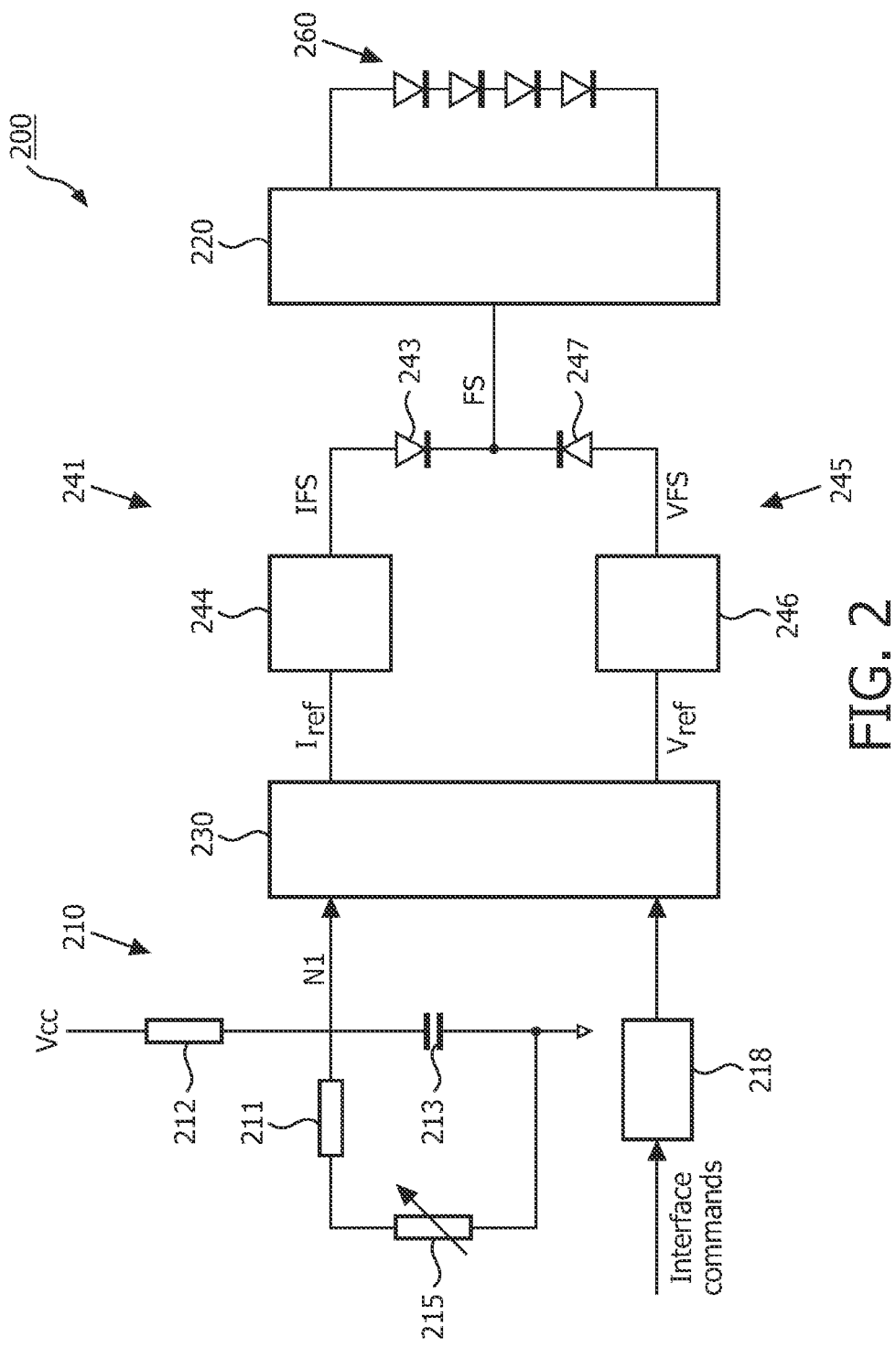
FIG. 2 is a simplified block diagram showing a programmable driver, according to a representative embodiment.

FIG. 2 is a simplified block diagram showing a programmable driver for driving a solid state lighting system, according to a representative embodiment.

Referring to FIG. 2, programmable driver 200 provides an output voltage to drive a solid state lighting module, such as representative LED module 260. The programmable driver 200 includes control circuit 210, processing circuit 230, current and voltage feedback loops 241 and 245, and driver power stage 220. The processing circuit 230 is configured to generate current reference signal $I_{ref}$ and voltage reference signal $V_{ref}$, which respectively indicate a reference current and a reference voltage for operation of the driver power stage 220. The current reference signal $I_{ref}$ may be calculated by the processing circuit 230, for example, based on desired dimming level of the LED module 260 and nominal current setting, discussed below. For example, the processing circuit 230 may receive a dimming control signal from a dimming input, which indicates a dimming level set at a dimmer.

The voltage reference signal $V_{ref}$ is determined based on a nominal current setting $I_{nom}$ and a predetermined power limit $P_{limit}$ of the driver power stage 220. The nominal current setting $I_{nom}$ provides the desired nominal current (regardless of the dimming level), and may be set via the control circuit 210, discussed below. The power limit $P_{limit}$ indicates the maximum output power that the driver power stage 220 is capable of delivering. For example, the power limit $P_{limit}$ is typically 75 W or 150 W, although any power limit $P_{limit}$ may be incorporated, without departing from the scope of the present teachings. In an embodiment, the voltage reference signal $V_{ref}$ is calculated as the quotient of the power limit $P_{limit}$ and the nominal current setting $I_{nom}$, or $V_{ref}=P_{limit}/I_{nom}$. Accordingly, the voltage reference signal $V_{ref}$ always corresponds to the maximum output voltage, as limited by the power limit $P_{limit}$, in consideration of the desired nominal current indicated by the nominal current setting $I_{nom}$.

In various embodiments, the processing circuit 230 may be implemented as a controller or microcontroller, for example, including a processor or central processing unit (CPU), application specific integrated circuits (ASICs), field-programmable gate arrays (FPGAs), or combinations thereof, using software, firmware, hard-wired logic circuits, or combinations thereof. When using a processor or CPU, a memory (not shown) is included for storing executable software/firmware and/or executable code that controls operations of the processing circuit 230. The memory may be any number, type and combination of nonvolatile read only memory (ROM) and volatile random access memory (RAM), and may store various types of information, such as computer programs and software algorithms executable by the processor or CPU. The memory may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like.

Figure 1:
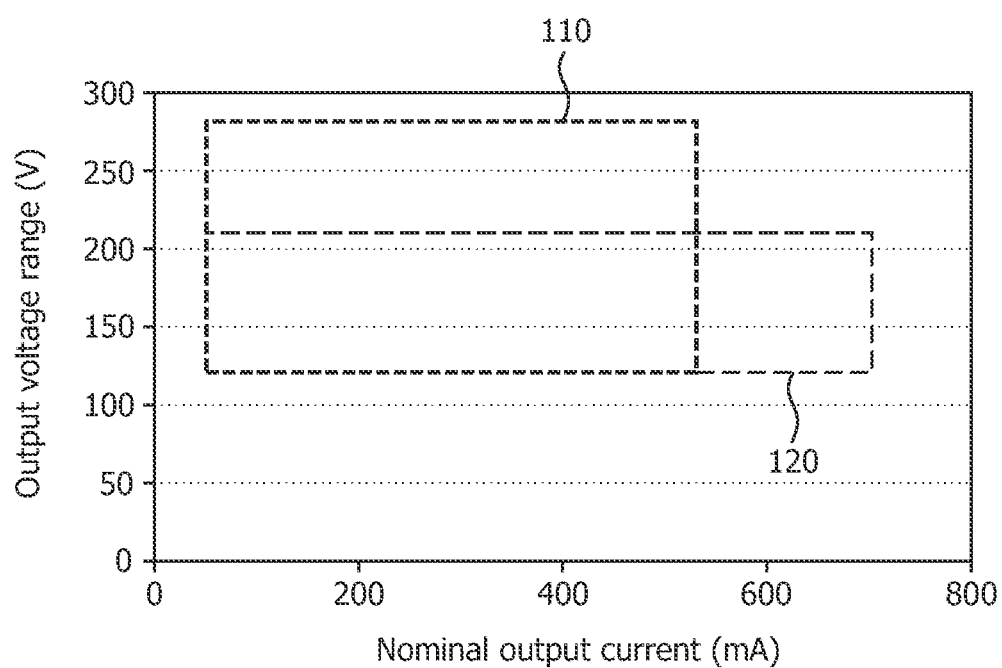
FIG. 1 is graph illustrating output current and voltage of conventional drivers.

According to the embodiment depicted in FIG. 1, the nominal current setting $I_{nom}$ may be manually set using the control circuit 210 by various means. The control circuit 210 includes variable set resistor 215 connected in series with first resistance 211, where the set resistor 215 and the first resistance 211 are connected in parallel with capacitor 213 between node N1 and ground. Second resistance 212 is connected between power supply voltage Vcc and node N1, where node N1 is an input to the processing circuit 230. A user is thus able to adjust the desired nominal current by simply varying the resistance of the set resistor 215. The control circuit 210 also includes interface 218, which may be a Digital Addressable Lighting Interface (DALI), for example. Generally, the interface 218 may be connected to an external controller (not shown), such as a server, a personal computer (PC) or other computer processing device, configured to control light levels of the LED module 260. The interface 218 provides the desired nominal current setting, on which the voltage reference signal $V_{ref}$ and the current reference signal $I_{ref}$ are based, to the processing circuit 230 in response to commands that specifically identify the desired current.

The processing circuit 230 generates and outputs the current reference signal $I_{ref}$ to current feedback loop 241, which includes output current control 244 and diode 243. The current reference signal $I_{ref}$ is calculated based on the nominal current setting $I_{nom}$ and the dimming level desired (which can be set by 1-10V dimmer, or mains dimming or DALI dimming schemes, for example). The output current control 244 compares the current reference signal $I_{ref}$ to drive current $I_D$ presently driving the LED module 260, and outputs current feedback signal IFS which is a function of the difference between the current reference signal $I_{ref}$ and the drive current $I_D$, if any. The processing circuit 230 also generates and outputs the voltage reference signal $V_{ref}$ based on the predetermined power limit $P_{limit}$ and the current reference signal $I_{ref}$, to voltage feedback loop 245, which includes output voltage control 246 and diode 247. The output voltage control 246 compares the voltage reference signal $V_{ref}$ to drive voltage $V_D$ presently driving the LED module 260, and outputs voltage feedback signal VFS indicating the difference between the voltage reference signal $V_{ref}$ and the drive voltage $V_D$, if any.

Both the current feedback signal IFS and the voltage feedback signal VFS may be provided to the driver power stage 220 as feedback signal FS for adjusting the drive current $I_D$ and/or the drive voltage $V_D$, accordingly. However, in the depicted embodiment, the feedback signal FS to the driver power stage 220 includes only one of the current feedback signal IFS and the voltage feedback signal VFS at a time. In particular, the diodes 243 and 247 cause only the one of the current feedback signal IFS and the voltage feedback signal VFS having the higher voltage level to be output in the feedback signal FS to the driver power stage 220. In this manner, the driver power stage 220 is able to limit maximum output voltage for driving the LED module based at least in part on the determined difference between the voltage reference signal $V_{ref}$ to drive voltage $V_D$ provided by the voltage feedback loop 245.

Figure 3:
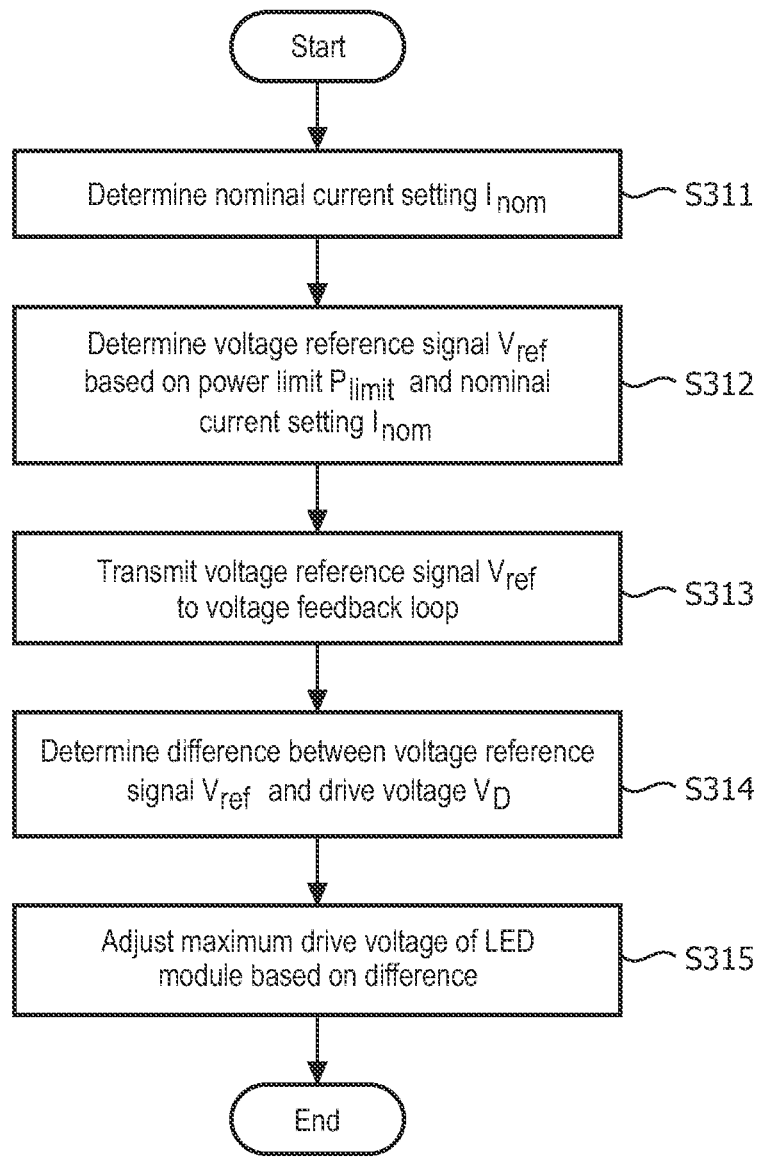
FIG. 3 is a flow diagram showing a process of driving a light-emitting diode (LED) module using a programmable driver, according to a representative embodiment.

FIG. 3 is a flow diagram showing a process of driving a LED module using a programmable driver, according to a representative embodiment.

Referring to FIG. 3, processing circuit 230 (e.g., implemented as a microprocessor) determines nominal current setting $I_{nom}$ at block 5311. Determination of the nominal current setting $I_{nom}$ may be based on a desired nominal current input to the processing circuit 230, for example, through set resistor 215 or interface 218, which may be a DALI circuit. A current reference signal $I_{ref}$ may be calculated based at least in part on the nominal current setting $I_{nom}$ and the dimming state of the LED module, indicated for example by a dimming control signal providing a dimming level set at a dimmer. The processing circuit 230 then determines voltage reference signal $V_{ref}$ at block 5312 based on predetermined power limit $P_{limit}$ of the driver power stage 220 and the nominal current setting $I_{nom}$. For example, the voltage reference signal $V_{ref}$ may be determined by dividing the predetermined power limit $P_{limit}$ by the nominal current setting $I_{nom}$. The voltage reference signal $V_{ref}$ thereby indicates the maximum output voltage of the driver power stage 220.

At step S313, the voltage reference signal $V_{ref}$ is transmitted to a voltage feedback loop, which includes output voltage control 246. The output voltage control 246 determines the difference between the voltage reference signal $V_{ref}$ and drive voltage $V_D$ output by the driver power stage 220 to the LED module 260 by comparing the two at step S314. The maximum drive voltage of the LED module 260 is then adjusted at step S315 based at least in part on the determined difference between the voltage reference signal $V_{ref}$ and the drive voltage $V_D$ of the LED module 260.

Figure 4:
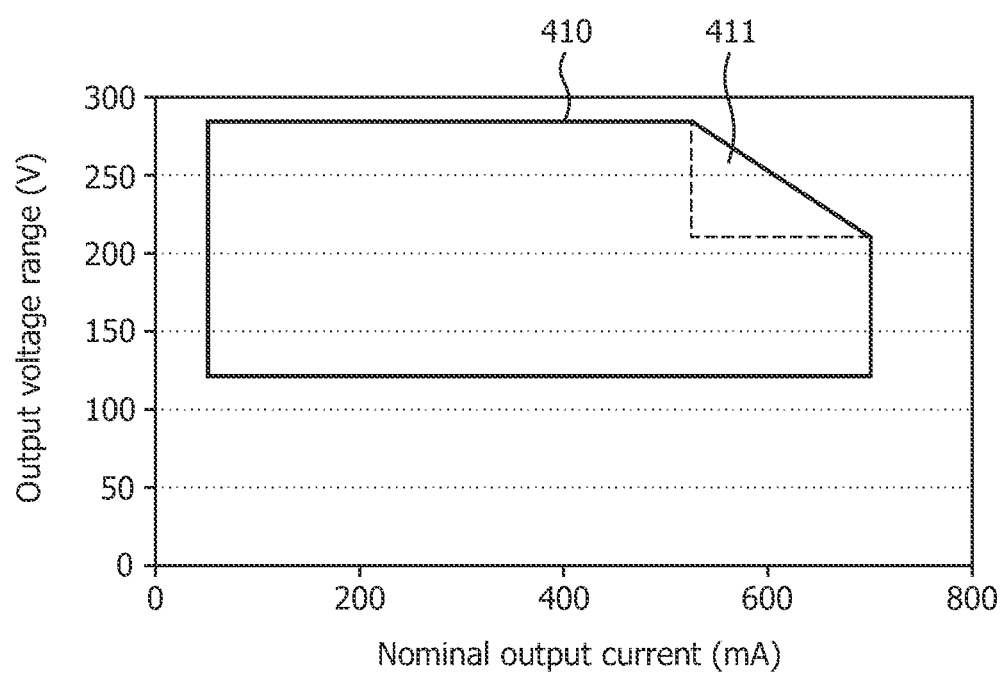
FIG. 4 is graph illustrating output current and voltage of a programmable driver, according to a representative embodiment.

FIG. 4 is graph illustrating output current and voltage of a programmable driver, according to a representative embodiment. More particularly, FIG. 4 shows operating area 410, which provides an example of how the maximum voltage of a 150 W programmable driver, such as programmable driver 200, is varied with the programmed output current. For example, when the drive current $I_D$ is set to 700 mA, the maximum output drive voltage $V_D$ is limited to 215V ($\approx$150 W/700 mA). In contrast, when the drive current $I_D$ is set to 530 mA, the maximum output drive voltage $V_D$ is limited to 280V ($\approx$150 W/530 mA). This ensures that the same programmable driver 200 can be programmed to operate for different types of LED loads. Likewise, it eliminates the need for developing different drivers for different numbers of LEDs in a string of the LED module. Further, the operational area 410 of the programmable driver 200 is larger as compared to the operational areas of the conventional first and second LED drivers discussed above with reference to FIG. 1. The additional area is indicated by triangular region 411.

Figure 5:
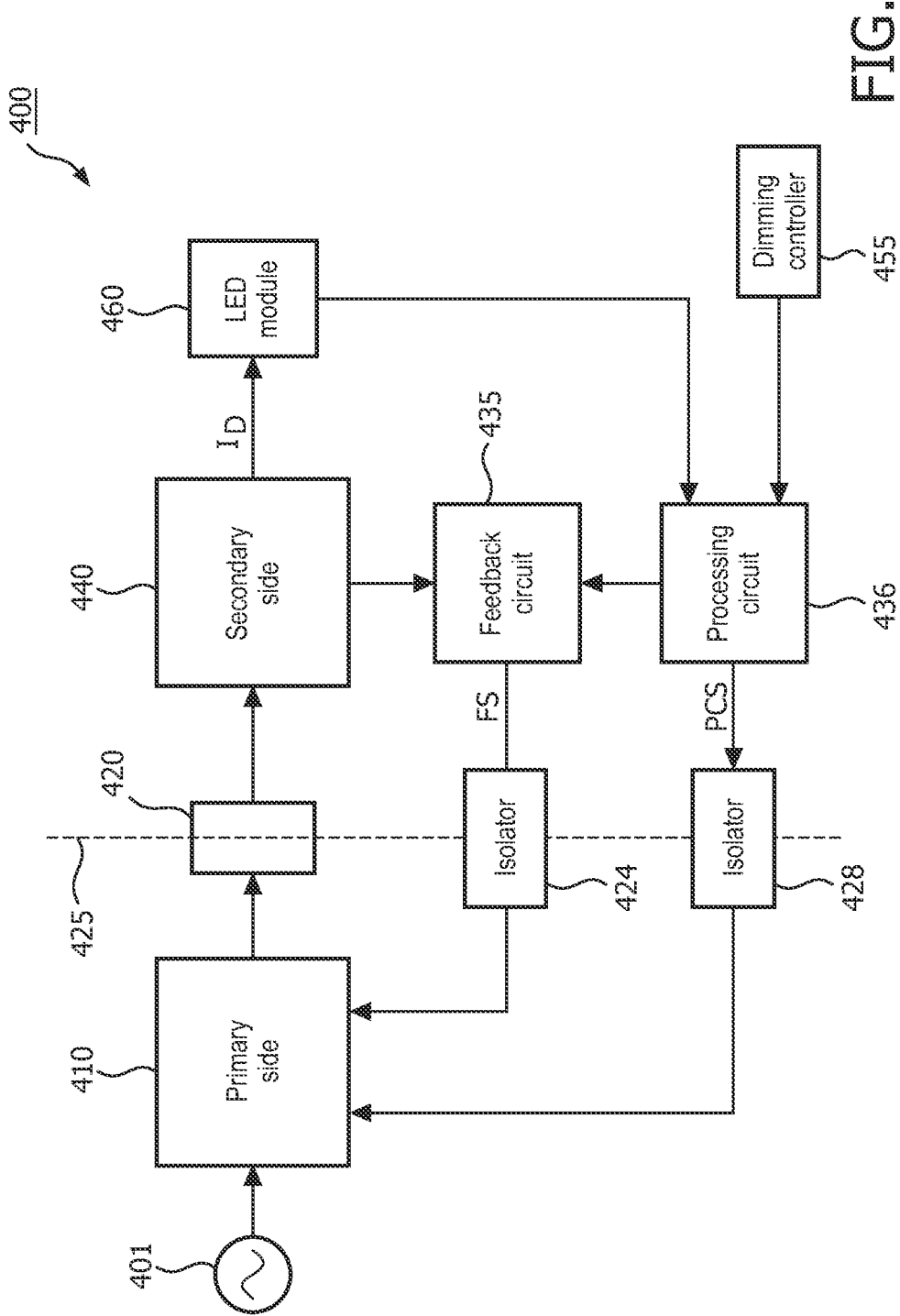
FIG. 5 is a simplified block diagram showing a programmable driver for a solid state lighting system, according to a representative embodiment.

FIGS. 5 and 6 are simplified block diagrams showing programmable drivers for solid state lighting systems, according to representative embodiments. It is understood that the programmable drivers depicted in FIGS. 5 and 6 are merely examples of types of drivers for which maximum output voltage may be limited for driving solid state lighting devices, according to various embodiments. Thus, the disclosed maximum output voltage limiting techniques may be applied to other types of isolated and non-isolated drivers, without departing from the scope and spirit of the present invention and its teachings.

Referring to FIG. 5, programmable driver 400 is configured to implement mains voltage based dimming of a solid state lighting module, indicated as LED module 460. The programmable driver 400 includes a driver power stage (such as driver power stage 220 depicted in FIG. 2) including isolating transformer 420 having a primary side connected to a primary side circuit 410 and a secondary side connected to a secondary side circuit 440. For example, the transformer 420 may be a high-frequency/high power transformer, such that isolation may be achieved when the LED module 460 is implemented as a high brightness LED module. The primary side circuit 410 receives mains voltage from mains voltage source 401. As discussed in detail below, the primary side circuit 410 includes a voltage rectifier (not shown in FIG. 5) for receiving the mains voltage and providing rectified mains voltage $V_R$. The secondary side circuit 440 is connected to the LED module 460, and outputs an adjustable drive current $I_D$ to the LED module 460 based on primary side current $I_{pri}$ and induced secondary side current $I_{sec}$ of the transformer 420.

The driver 400 further includes processing circuit 436, which may be substantially the same as the processing circuit 230, discussed above with reference to FIG. 2. The processing circuit 436 may receive dimming control signals from dimming controller 455, for controlling light output by the LED module 460. The processing device 436 is located across isolation barrier 425 from the primary side circuit 410 because the processing device 436 also senses signals from the LED module 460, as well as other dimming controllers (not shown) and provides supervisory reference commands to feedback circuit 435, as discussed below. For example, in the depicted configuration, the processing circuit 436 may receive a dimming control signal from the dimming controller 455, indicating a set dimming level, and one or more LED feedback signals from the LED module 460, including light level, temperature, and the like. Reference signals may be generated by the processing circuit 436, including current reference signal $I_{ref}$ and/or voltage reference signal $V_{ref}$, in response to at least the nominal current setting $I_{nom}$, the dimming control signal and/or the LED feedback signals.

The feedback circuit 435 may include current and voltage feedback loops, such as current and voltage feedback loops 241 and 245 discussed above with reference to FIG. 2. The feedback circuit 435 receives the reference signals from the processing circuit 436, and compares the reference signals with corresponding electrical conditions received from secondary side circuit 440 and/or the LED module 460, such as drive current $I_D$ and drive voltage $V_D$. The feedback circuit 435 generates feedback signal FS based on the results of the comparisons, and transmits the feedback signal FS to the primary side circuit 410 across the isolation barrier 425, e.g., via isolator 424. The isolator 424 may be an optical isolator, for example, which enables information (e.g., the feedback signal FS) to be exchanged using light signals, while maintaining electrical isolation across the isolation barrier 425. Thus, the isolator 434 may be implemented accurately using low cost bi-level opto-isolators, for example. Coupling across the isolation barrier 425 may be obtained using other types of isolation, such as transformers, without departing from the scope of the present teachings. The feedback signal FS may include the current feedback signal IFS and/or the voltage feedback signal VFS, discussed above. For example, when the reference signals include current reference signal $I_{ref}$, an output current control (not shown) of the feedback circuit 435 compares the current reference signal $I_{ref}$ with the drive current $I_D$ being supplied to the LED module 460. The feedback circuit 435 then generates a feedback signal FS that indicates the difference, if any, between the current reference signal $I_{ref}$ and the drive current $I_D$.

In response to the feedback signal FS, the primary side circuit 410 may adjust a primary side voltage $V_{pri}$ input to the primary side of the transformer 420, as needed, which in turn adjusts a secondary voltage $V_{sec}$ through the secondary side of the transformer 420 and thus the drive current $I_D$ output by the secondary circuit 440 to the LED module 460. Accordingly, the drive current $I_D$ drives the LED module 460 to provide the amount of light corresponding to the setting of the dimming controller 455. In an embodiment, the processing circuit 436 may also provide a power control signal PCS to the primary side circuit 410 across the isolation barrier 425 via isolator 428, which selectively controls application of power to the primary side circuit 410 and the secondary side circuit 440, as discussed below with reference to FIG. 6.

FIG. 6 is a simplified block diagram showing a more detailed programmable driver, according to a representative embodiment.

Referring to FIG. 6, programmable driver 600 is configured to implement dimming and to limit maximum output voltage for driving the solid state lighting module, indicated as illustrative LED module 660. The programmable driver 600 includes a driver power stage (such as driver power stage 220 depicted in FIG. 2) including an isolating transformer 620 having a primary side connected to a primary side circuit 610 and a secondary side connected to a secondary side circuit 640, where the primary and secondary sides are separated by isolation barrier 625. The primary side circuit 610 receives mains voltage from mains voltage source 601. The secondary side circuit 640 is connected to the LED module 660, and outputs an adjustable drive current $I_D$ to the LED module 660 based on primary side current $I_{pri}$ of the transformer 620, as discussed below. The driver 600 further includes microprocessor 936, which may be substantially the same as discussed above with reference to the processing circuit 230 in FIG. 2.

The primary side circuit 610 includes voltage rectifier 611, boost power factor correction (PFC) circuit 612, boost control circuit 613, PWM half-bridge converter 614, and PWM half-bridge control stage 615. The voltage rectifier 611, and an EMI filter, 601 receives the mains voltage from the mains voltage source 601, and outputs rectified mains voltage $V_R$ (and corresponding rectified mains current $I_R$), thereby converting the AC mains voltage into a rectified sinusoidal waveform. The rectification is needed to create a constant DC voltage via the boost PFC circuit 612, discussed below. The EMI filter may include a network of inductors and capacitors (not shown) that limit the high frequency components injected into the line.

The rectified mains voltage $V_R$ is provided to the boost PFC circuit 612, which converts the rectified sinusoidal waveform of the rectified mains voltage $V_R$ to a fixed, regulated DC voltage, indicated as boosted voltage $V_B$ (and corresponding rectified boosted current $I_B$). In addition, the boost PFC circuit 612 ensures that the rectified mains current $I_R$ drawn from the voltage rectifier 611 and input to the boost PFC circuit 612 is in phase with the rectified mains voltage $V_R$. This ensures that the driver 600 operates close to unity power factor. The boost control circuit 613 controls the switches of a boost converter in the boost PFC circuit 612 accordingly.

The PWM half-bridge converter 614 converts the DC boosted voltage $V_B$ received from the boost PFC circuit 612 to a high-frequency pulsating signal, primary side voltage $V_{pri}$ (and corresponding pulsed primary side current $I_{pri}$), under control of the PWM half-bridge control stage 615. The primary side voltage $V_{pri}$ may be a PWM signal, for example, having a pulse width set by operation of switches (not shown) in the PWM half-bridge converter 614. The primary side voltage $V_{pri}$ is applied to the primary side (primary winding) of the transformer 620. The PWM half-bridge control stage 615 determines the pulse width of the primary side voltage $V_{pri}$ to be implemented by the PWM half-bridge converter 614 based on a feedback signal FS, which is determined by at least one of a current feedback signal IFS received from output current control 644 and a voltage feedback signal VFS received from output voltage control 646 of feedback circuit 645, as discussed below.

Secondary side voltage $V_{sec}$ (and corresponding secondary side current $I_{sec}$) is induced in the secondary side (secondary winding) of the transformer 620 by the primary side voltage $V_{pri}$. The secondary side voltage $V_{sec}$ is rectified and high-frequency filtered by output rectifier/filter circuit 642 included in the secondary side circuit 640 to obtain the desired drive voltage $V_D$ and corresponding drive current $I_D$ for driving the LED module 660. The magnitude of the drive current $I_D$ in particular dictates the illumination level of the one or more LEDs in the LED module 660.

As discussed above with regard to output current control 244 and output voltage control 246 in FIG. 1, the output current control 644 compares the drive current $I_D$ with a current reference signal $I_{ref}$ output by the microprocessor 636 to obtain a current difference ΔI for determining current feedback signal IFS, and the output voltage control 646 compares the drive voltage $V_D$ with a voltage reference signal $V_{ref}$ also output by the microprocessor 636 to obtain a voltage difference ΔV for determining voltage feedback signal VFS. A drive compensator (not shown) determines the feedback signal FS based on at least one of the current feedback signal IFS and the voltage feedback signal VFS. The microprocessor 636 determines the values of the current and voltage reference signals $I_{ref}$ and $V_{ref}$, as discussed above. For example, the voltage reference signal $V_{ref}$ may be calculated as the quotient of power limit $P_{limit}$ of the driver 600 and the nominal current setting $I_{nom}$. Accordingly, the voltage reference signal $V_{ref}$ always corresponds to the maximum output voltage, as limited by the power limit $P_{limit}$, in consideration of the nominal current setting $I_{nom}$.

The output current control 644 may also receive a softstart signal (short pulse) from the microprocessor 636, which saturates the current feedback loop via output current control 644. After the softstart signal goes low, the current reference signal $I_{ref}$ from the microprocessor 636 is gradually increased in order to avoid flicker in the output LED current. During startup, the current difference ΔI may be determined as the current reference signal $I_{ref}$ less the drive current $I_D$ and the softstart signal, and the voltage difference ΔV may be determined as the voltage reference signal $V_{ref}$ less the drive voltage $V_D$ and the softstart signal.

As mentioned above, the feedback signal FS indicates at least one of the current feedback signal IFS and the voltage feedback signal VFS provided by the output current control 644 and the output voltage control 646, respectively. The current feedback loop (using the current feedback signal IFS) is typically more active, although the voltage feedback loop (using the voltage feedback signal VFS) may be used to reduce output current through the feedback signal FS to limit maximum output voltage, as needed. In the depicted embodiment, the feedback signal FS is provided to the PWM half-bridge control stage 615 across the isolation barrier 625 via first optical isolator 624. The feedback signal FS thus controls the PWM half-bridge converter 614 to adjust the pulse width of the primary side voltage $V_{pri}$ based on the feedback signal FS. For example, if the drive current $I_D$ exceeds the current reference signal $I_{ref}$, as indicated by the feedback signal FS, the PWM half-bridge control stage 615 will control the PWM half-bridge converter 614 to reduce the primary side voltage $V_{pri}$, and thus the primary current $I_{pri}$ as well, for example, by reducing the pulse width of the same. The change in the primary side voltage $V_{pri}$ is reflected in a corresponding change in the secondary voltage $V_{sec}$, as well as the drive voltage $V_D$ and the drive current $I_D$ output by the driver 600 for driving the LED module 660. Thus, the PWM half-bridge control stage 615 is able to regulate the drive voltage $V_D$ and/or the drive current $I_D$ of the driver 600 to a certain value.

The boosted voltage $V_B$ output by the boost PFC circuit 612 is also provided to power supply 627, which may be a step down DC-DC converter, such as a Viper power supply, for example. The power supply 627 may step down the boosted voltage $V_B$ to a lower voltage, such as 18V. The primary side of the power supply 627 is configured to selectively provide a regulated voltage to the various components of the primary side circuit 610 (e.g., voltage rectifier 611, boost PFC circuit 612, boost control circuit 613, PWM half-bridge converter 614, PWM half-bridge control stage 615) under control of switch 617. The operation and timing of the switch 617 (On/Off) is determined by power control signal PCS output by the microprocessor 636, and received by the switch 617 across the isolation barrier 625 via second optical isolator 628 (which may be the same as or different than the first optical isolator 624). The secondary side of the power supply 627 is configured to provide a regulated voltage to the various components of the secondary side circuit 640 (e.g., output rectifier/filter circuit 642). In an illustrative configuration, the power supply 627 may be a flyback converter with two isolated outputs: one for the primary side and one for the secondary side.

The microprocessor 636 is configured to receive a dimming signal from dimming input 654 through dimming control interface 655, where the dimming signal indicates the desired level of dimming, e.g., set by the user, and/or a desired nominal current setting $I_{nom}$ through a control circuit (such as control circuit 210 shown in FIG. 2). For example, the dimming input 654 may provide a dimming scale from 1V to 10V, where 1V indicates maximum dimming (lowest level of output light) and 10V indicates minimum or no dimming (highest level of output light). The microprocessor 636 may receive multiple dimming level inputs, including the dimming input 654, and sets current reference signal $I_{ref}$ and/or the voltage reference signal $V_{ref}$ in response. The microprocessor 636 also determines the voltage reference signal $V_{ref}$ based on the power limit $P_{limit}$ and the nominal current setting $I_{nom}$, as discussed above, for limiting maximum output voltage. The microprocessor 636 also receives feedback from the LED module 660, e.g., via negative temperature coefficient (NTC) sensing circuit 651 and RSET sensing circuit 652. The NTC sensing circuit 651 senses the temperature of the LED module 660, and the RSET sensing circuit 652 senses the value of an external resistor which also sets the current reference signal $I_{ref}$.

In addition, the microprocessor 636 generates the power control signal PCS, which is a low level switch signal used to turn ON/OFF the primary side supply and hence the LED driver 600. For example, the power control signal PCS may be used to turn OFF the LED driver 600 when a standby command is received from an external input. The power control signal PCS is sent by the microprocessor 636 to the primary side circuit 610 across the isolation barrier 625 via the second optical isolator 628 to operate the switch 617, discussed above.

The programmable solid state lighting system driver discussed above may be applied to retrofit LED applications, where it is desired to control the light output based on the mains voltage signal. For example, the driver may be used for applications in which the LED modules are replacing traditional magnetic ballasts. In addition, the driver may be used for LED modules operating with different power limits, and can adjust and limit maximum output voltage for driving the LED modules, accordingly.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Any reference numerals appearing in the claims, are provided merely for convenience and should not be construed as limiting the appended claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A programmable driver for driving a solid state lighting device, the driver comprising:
   a processing circuit configured to determine a voltage reference signal (Vref) based on a nominal current setting and a predetermined power limit;
   a voltage feedback loop configured to receive the voltage reference signal and to generate a voltage feedback signal comprising a difference between a reference voltage indicated by the voltage reference signal and a drive voltage of the solid state lighting device;
   a current feedback loop configured to determine a generate a current feedback signal comprising a difference between a reference current and a drive current of the solid state lighting device; and
   a power stage configured to adjust a maximum output voltage of the driver to enable driving the solid state lighting device based at least in part on the voltage feedback signal when the voltage feedback signal has a higher level than the current feedback signal, wherein the predetermined power limit indicates a maximum output power the power stage is able to deliver.

2. The driver of claim 1, wherein the processing circuit determines the reference voltage signal by dividing the predetermined power limit by the nominal current setting.

3. The driver of claim 1, wherein the nominal current setting indicates a desired nominal output current for driving the solid state lighting device.

4. The driver of claim 3, further comprising: a variable set resistor configured to enable adjusting the nominal current setting.

5. The driver of claim 3, further comprising: a digital addressable lighting interface (DALI) controller configured to enable adjusting the nominal current setting using a controller.

6. The driver of claim 1, wherein the current feedback loop is further configured to receive a current reference signal from the processing circuit and to generate the current feedback signal comprising the difference between the reference current indicated by the current reference signal and the drive current of the solid state lighting device.

7. The driver of claim 6, wherein the power stage is further configured to adjust the maximum output voltage for driving the solid state lighting device based at least in part on the current feedback signal.

8. The driver of claim 7, wherein the current reference signal is determined based at least in part on a dimming signal indicating a desired dimming level of the solid state lighting device.

9. The driver of claim 7, wherein the current feedback loop comprises a first diode configured to pass the current feedback signal and the voltage feedback loop comprises a second diode configured to pass the voltage feedback signal, and
   wherein the power stage adjusts the output voltage for driving the solid state lighting device based at least in part on the current feedback signal when the current feedback signal has a higher level than the voltage feedback signal.

10. The driver of claim 1, wherein the power stage comprises:
    a transformer having a primary side and a secondary side;
    a primary side circuit connected to the primary side of the transformer, the primary side circuit being configured to generate a primary side voltage in response to the voltage feedback signal; and
    a secondary side circuit connected to the secondary side of the transformer and configured to provide an output current for driving the solid state lighting device in response to the primary side voltage.

11. A method of driving a light-emitting diode (LED) module using a programmable driver, the method comprising:
determining a nominal current setting indicating a desired nominal current provided by the programmable driver;
determining a reference voltage signal by dividing a predetermined power limit of the programmable driver by the nominal current setting, wherein the predetermined power limit indicates a maximum output power able to be delivered to the LED module;
generating a voltage feedback signal comprising a difference between a reference voltage indicated by the reference voltage signal and a drive voltage provided to the LED module;
generating a current feedback signal comprising a difference between a reference current and a drive current provided to the LED module; and
adjusting a maximum drive voltage provided to the LED module based at least in part on the generated voltage feedback signal when the voltage feedback signal has a higher level than the current feedback signal.

12. The method of claim 11, wherein determining the nominal current setting comprises receiving the nominal current setting from a Digital Addressable Lighting Interface (DALI).

13. The method of claim 11, wherein determining the nominal current setting comprises receiving the desired nominal current from a control circuit comprising a variable set resistor, and determining the nominal current setting based on the desired nominal current.

14. The method of claim 11, further comprising: determining a reference current signal based on at least one of the nominal current setting and a dimming level setting.

15. The method of claim 14, further comprising:
generating the current feedback signal comprising the difference between the reference current indicated by the current reference signal and the drive current provided to the LED module;
generating a feedback signal based on the one of the current feedback signal and the voltage feedback signal having a highest voltage level; and
providing the feedback signal to a driver power stage for adjusting at least one of the drive current and the drive voltage.

16. The method of claim 11, further comprising adjusting the maximum drive voltage provided to the LED module based at least in part on the generated current feedback signal when the voltage feedback signal does not have a higher level than the current feedback signal.

17. A programmable driver for driving a light-emitting diode (LED) module, the driver comprising:
a microcontroller configured to determine a voltage reference signal based on a nominal current setting and a predetermined power limit;
an output voltage control configured to receive the voltage reference signal and to generate a voltage feedback signal indicating a difference between a reference voltage indicated by the voltage reference signal and a drive voltage of the LED module;
an output current control configured to generate a current feedback signal indicating a difference between a reference current and a drive current of the LED module; and
a power stage configured to adjust a maximum output voltage of the driver to enable driving the LED module based at least in part on the voltage feedback signal when the voltage feedback signal has a higher level than the current feedback signal,
wherein the predetermined power limit indicates a maximum output power that the power stage is able to deliver.

18. The driver of claim 17, further comprising:
a variable set resistor in a control circuit operable to provide a desired nominal current, the nominal current setting indicating the desired nominal current.

19. The driver of claim 17, further comprising: a Digital Addressable Lighting Interface (DALI) operable to provide the nominal current setting.

20. The driver of claim 17, wherein the power stage is further configured to adjust the maximum output voltage of the driver to enable driving the LED module based at least in part on the current feedback signal when the voltage feedback signal does not have a higher level than the current feedback signal.

* * * * *